United States Patent
Vayanos et al.

(10) Patent No.: US 7,254,402 B2
(45) Date of Patent: Aug. 7, 2007

(54) GPS SATELLITE SIGNAL ACQUISITION ASSISTANCE SYSTEM AND METHOD IN A WIRELESS COMMUNICATIONS NETWORK

(75) Inventors: Alkinoos Vayanos, San Diego, CA (US); Samir Soliman, San Diego, CA (US); Parag Agashe, San Diego, CA (US); Jeremy Stein, Haifa (IL); Peter Gaal, San Diego, CA (US); Ivan Jesus Fernandez-Corbaton, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 496 days.

(21) Appl. No.: 09/910,361

(22) Filed: Jul. 20, 2001

(65) Prior Publication Data
US 2002/0123352 A1     Sep. 5, 2002

Related U.S. Application Data

(60) Provisional application No. 60/239,774, filed on Oct. 12, 2000.

(51) Int. Cl.
*H04Q 7/20*     (2006.01)
(52) U.S. Cl. ............... 455/456.1; 455/404.2; 455/67.16; 342/357.01
(58) Field of Classification Search .......... 455/456, 455/457, 561, 427, 502, 456.1, 456.3, 440, 455/404.2, 67.16; 342/357.15, 357.1, 463, 342/357.06, 357.01, 357.09
See application file for complete search history.

(56) References Cited

U.S. PATENT DOCUMENTS

| | | | | |
|---|---|---|---|---|
| 5,311,194 A | * | 5/1994 | Brown | 342/357.06 |
| 5,574,660 A | * | 11/1996 | Diekelman | 455/13.1 |
| 5,646,630 A | * | 7/1997 | Sheynblat et al. | 342/357.14 |
| 5,736,960 A | * | 4/1998 | Murphy et al. | 342/357.02 |
| 5,936,573 A | * | 8/1999 | Smith | 701/213 |
| 6,070,078 A | * | 5/2000 | Camp et al. | 455/456.2 |
| 6,121,928 A | * | 9/2000 | Sheynblat et al. | 342/463 |
| 6,188,351 B1 | * | 2/2001 | Bloebaum | 342/357.15 |
| 6,271,788 B1 | * | 8/2001 | Longaker et al. | 342/357.03 |
| 6,295,023 B1 | * | 9/2001 | Bloebaum | 342/357.06 |
| 6,300,899 B1 | * | 10/2001 | King | 342/357.12 |
| 6,373,432 B1 | * | 4/2002 | Rabinowitz et al. | 342/357.16 |

(Continued)

FOREIGN PATENT DOCUMENTS

WO     9919743     4/1999

(Continued)

*Primary Examiner*—Matthew D. Anderson
*Assistant Examiner*—Tan Trinh
(74) *Attorney, Agent, or Firm*—Thomas Rouse; Bruce W. Greenhaus; Linda G. Gunderson (57)     ABSTRACT

A system and method for assisting an integrated GPS/wireless terminal unit in acquiring one or more GPS satellite signals from the GPS satellite constellation. The invention includes a method for narrowing the PN-code phase search. That is, by accounting for the variables in geographic location and time delay relative to GPS time, the systems and methods of the present invention generate a narrow code-phase search range that enables the terminal unit to more quickly acquire and track the necessary GPS satellites, and thereby more quickly provide accurate position information to a requesting entity.

17 Claims, 8 Drawing Sheets

U.S. PATENT DOCUMENTS

| | | |
|---|---|---|
| 6,408,178 B1 * | 6/2002 | Wickstrom et al. .......... 455/427 |
| 6,415,154 B1 * | 7/2002 | Wang et al. .............. 455/456.1 |
| 6,433,739 B1 * | 8/2002 | Soliman ...................... 342/387 |
| 6,473,030 B1 * | 10/2002 | McBurney et al. .... 342/357.03 |
| 6,570,529 B2 * | 5/2003 | Richton et al. ........ 342/357.02 |
| 6,603,978 B1 * | 8/2003 | Carlsson et al. ............. 455/502 |
| 6,636,744 B1 * | 10/2003 | Da .......................... 455/456.1 |
| 6,665,541 B1 * | 12/2003 | Krasner et al. ............. 455/502 |
| 6,778,134 B2 * | 8/2004 | Dooley et al. ........... 342/357.1 |
| 2002/0183070 A1 * | 12/2002 | Bloebaum et al. .......... 455/456 |
| 2003/0011513 A1 * | 1/2003 | Zhao et al. ............. 342/357.09 |

FOREIGN PATENT DOCUMENTS

| | | |
|---|---|---|
| WO | 0001031 | 1/2000 |
| WO | 0036431 | 6/2000 |
| WO | 0049695 | 8/2000 |

* cited by examiner

GPS SATELLITE SIGNAL ACQUISITION ASSISTANCE SYSTEM AND METHOD IN A WIRELESS COMMUNICATIONS NETWORK

RELATED APPLICATIONS

This application claims priority to U.S. Provisional Application No. 60/239,774, filed Oct. 12, 2000.

BACKGROUND OF THE INVENTION

1. Field of the Invention

The present invention relates to communications systems. More specifically, the present invention relates to GPS positioning systems and wireless networks.

2. Description of the Related Art

The trend in the wireless communications industry is to provide a service that generates accurate position information for wireless terminals and to provide this information to requesting entities. This trend is driven to a large extent by the needs of public safety service providers in their efforts to promptly respond to emergency calls. In many instances, the calling party may be unwilling or unable to provide accurate position information. When such information is provided automatically, as is the case in wireline telephony services, public safety officials are able to respond and render service quickly. In general, the place that a public safety entity receives '911' calls is known as the Public Safety Answering Point (hereinafter 'PSAP').

In wireless telephone networks, such as cellular or PCS networks, the provision of automatic calling party position information is more difficult than in wireline telephony networks because of the inherent mobility of wireless telephones. In some wireless systems, the PSAP is provided with position information that resolves which wireless base station, or perhaps which radio sector within a wireless base station, is handling the emergency call. Position information to this degree of resolution only identifies the calling party location to a rather broad geographic region, so the PSAP dispatchers have to rely on the position information given orally by the calling party before they can respond to a emergency service request.

The Federal Communications Commission (hereinafter 'FCC') forced the market to address the position information provision issue in June 1996 when it adopted a report and order for enhanced E911 wireless service. On Dec. 23, 1997, the FCC issued a revised version of the report and order. Highlights are as follows:

Within twelve months after the effective date of the rules, the FCC will require that cellular, broadband PCS and geographic area Specialized Mobile Radio (hereinafter 'SMR') systems transmit to the PSAP all E911 emergency calls from any mobile station that transmits a mobile identification number (hereinafter 'MIN'), or its functional equivalent, without any interception by the carrier for credit checks or other validation procedures.

Beginning twelve months (and completed within eighteen months) after the effective date of the rules, the FCC requires cellular, broadband PCS and geographic SMR licensees to offer certain E911 enhancements. These E911 enhancements include the ability to relay a caller's telephone number (call back the E911 caller if a call is disconnected). Also, carriers must be capable of routing E911 calls to an appropriate PSAP.

Within five years after the effective date of the rules, the location (position) of the mobile station making the emergency call must be provided to the qualified PSAP in two-dimensions and have an accuracy within a 125 meter radius measured using root mean square (RMS) methods. According to the FCC, a request is qualified if and when (1) a PSAP indicates it has the capability to receive and utilize the number and location passed along by the wireless carrier, and (2) there is a cost-recovery mechanism in place.

The FCC position accuracy requirements are a minimum so suppliers and manufacturers of wireless network equipment are working to provide location data that is more accurate than the minimum. For example, U.S. Pat. No. 6,021,330 to Vanucci for MOBILE LOCATION ESTIMATION IN A WIRELESS SYSTEM USING DESIGNATED TIME INTERVALS OF SUSPENDED COMMUNICATIONS, assigned to Lucent Technologies, teaches a system wherein the location of mobile stations is estimated through measurement of differential path delay times of beacon signals synchronously transmitted by several base stations. A trilateration calculation is made to determine position.

Another approach to location measurement of a mobile station in a wireless network is taught by a patent assigned to Qualcomm Inc.: U.S. Pat. No. 6,081,299 to Soliman et al., for SYSTEM AND METHOD FOR DETERMINING THE POSITION OF A WIRELESS CDMA TRANSCEIVER. Soliman et al. teach a more sophisticated approach to mobile station location determination utilizing both Global Positioning System satellite and terrestrial base station signals. Generally, Solimon et al. teach the process of receiving at a base station a first signal transmitted from a first GPS satellite and a second signal transmitted from a second GPS satellite. The mobile station is adapted to receive these GPS signals as well and transmit a third signal to the base station in response thereto. The base station receives the third signal and uses it to calculate the position of the mobile station. In one specific implementation, the base station sends aiding information to the mobile station. The aiding information is used by the mobile station to more quickly acquire the signals transmitted by the first and second satellites than is possible without the presence of such aiding information.

The use of GPS satellite position and velocity measurement is a good approach to wireless terminal location determination because positions can be determined within the accuracy requirements of the FCC report and order. It also has other benefits in that new GPS features can be integrated into a wireless telephone once the GPS technology has been add to the unit. These extra value features can be used to increase the market value of the product and to enhance revenues through the provision of additional services to the end users of such products.

The GPS navigation system employs satellites that are in orbit around the Earth. Any user of GPS, anywhere on Earth, can derive precise navigation information including 3-dimensional position, velocity and time of day. The GPS system includes 24 satellites that are deployed in circular orbits with radii of 26,600 kilometers in three planes inclined at 55° with respect to the equator and spaced 120° with respect to one another. Eight satellites are equally spaced within each of the three orbit paths. Position measurements using GPS are based on measurements of propagation delay times of GPS signals broadcast from the orbiting satellites to a GPS receiver. Normally, reception of signals from 4 satellites is required for precise position determination in 4 dimensions (latitude, longitude, altitude, and time). Once the receiver has measured the respective signal propagation delays, the range to each satellite is calculated by multiplying each delay by the speed of light. Then, the location and time are found by solving a set of four equations with four unknowns incorporating the measured ranges and the known locations of the satellites. The precise capabilities of the GPS system are maintained by means of on-board atomic clocks for each satellite and by ground tracking stations that continuously monitor and correct satellite clock and orbit parameters.

Each GPS satellite transmits two direct-sequence-coded spread spectrum signals in the L-band. An L1 signal at a carrier frequency of 1.57542 GHz, and an L2 signal at 1.2276 GHz. The L1 signal consists of two phase-shift keyed (PSK) spread spectrum signals modulated in phase quadrature. The P-code signal (P for precise), and the C/A-code signal (C/A for coarse/acquisition). The L2 signal contains only the P-code signal. The P and C/A codes are repetitive pseudo-random sequences of bits (termed "chips" by spread spectrum engineers) that are modulated onto the carriers. The clock-like nature of these codes is utilized by the receiver in making time delay measurements. The codes for each satellite are unique, allowing the receiver to distinguish which satellite transmitted a given code, even though they are all at the same carrier frequency. Also modulated onto each carrier is a 50 bit/sec data stream that contains information about system status and satellite orbit parameters, which are needed for the navigation calculations. The P-code signals are encrypted, and are not generally available for commercial and private users. The C/A signal is available to all users.

The operations performed in a GPS receiver are for the most part typical of those performed in any direct-sequence spread spectrum receiver. The spreading effect of the pseudo-random code modulation must be removed from each signal by multiplying it by a time-aligned, locally-generated copy of the code, in a process known as despreading. Since the appropriate time alignment, or code delay, is unlikely to be known at receiver start-up, it must be determined by searching during the initial "acquisition" phase of a GPS receiver's operation. Once determined, proper code time-alignment is maintained during the "tracking" phase of GPS receiver operation.

Once the received signal is despread, each signal consists of a 50 bit/sec PSK signal at an intermediate carrier frequency. The exact frequency of this signal is uncertain due to the Doppler effect caused by relative movement between satellite and terminal unit, and to local receiver GPS clock reference error. During initial signal acquisition this Doppler frequency must also be searched for, since it is usually unknown prior to acquisition. Once the Doppler frequency is approximately determined, carrier demodulation proceeds.

After carrier demodulation, data bit timing is derived by a bit synchronization loop and the data stream is finally detected. A navigation calculation may be undertaken once the signals from 4 satellites have been acquired and locked onto, the necessary time delay and Doppler measurements have been made, and a sufficient number of data bits (enough to determine the GPS time reference and orbit parameters) have been received.

One drawback of the GPS system for location determination is the long time needed for the initial signal acquisition phase. As mentioned above, before the four satellite signals can be tracked they must be searched for in a two-dimensional search "space", whose dimensions are code-phase delay, and Doppler frequency shift. Typically, if there is no prior knowledge of a signal's location within this search space, as would be the case after a receiver "cold start", a large number of code delays (about 2000) and Doppler frequencies (about 15) must be searched for each satellite that is to be acquired and tracked. Thus, for each signal, up to 30,000 locations in the search space must be examined. Typically these locations are examined one-at-a-time sequentially, a process which can take 5 to 10 minutes. The acquisition time is further lengthened if the identities (i.e., PN-codes) of the four satellites within view of the receiving antenna are unknown.

In the case where a GPS receiver has already acquired the satellite signals and is then in tracking mode, the position determination process is virtually instantaneous. However, in the routine use of wireless terminals, users turn the power on and quickly begin operation. This may be the case when an emergency communication is intended. In such situations, the time delay associated with a 5 to 10 minute GPS satellite signal acquisition cold-start by a GPS/wireless terminal unit before a position fix can be obtained limits the response time of the system.

Thus, a need remains in the art for a system and method for decreasing the time required to acquire GPS satellite signals and render a position fix in a GPS/wireless terminal unit.

SUMMARY OF THE INVENTION

The need in the art is addressed by the systems and methods of the present invention. In a first embodiment, a system, for transmitting a GPS receiver code-phase search ranges to a integrated GPS/wireless terminal unit operating in a wireless network is disclosed. The system includes a base station further having a GPS receiver that generates a GPS time reference. Also, a controller that calculates a GPS code-phase search range with reference to the base station geographic location plus the wireless coverage area, and with reference to the GPS time reference plus the estimated wireless signal propagation delay within the coverage area. And, a transmitter coupled to the controller and operable to transmit the calculated GPS code search range to the terminal unit. In a refinement of the foregoing system, the GPS code-phase search range is defined by a center value and a size value.

In another embodiment of the system, the base station includes a means for obtaining a time offset for the GPS/wireless terminal unit relative to the GPS time reference and the controller calculates the GPS code-phase search range with reference to the base station geographic location plus the wireless coverage area, and the time reference. In a refinement of this embodiment, the means for obtaining a time offset utilizes the round-trip wireless signal propagation time between the base station and the terminal unit to establish that time offset.

In another embodiment of the system, the base station includes a means for obtaining a location reference for the GPS/wireless terminal unit and the controller operates to calculate a GPS code-phase search range with reference to the location reference, in addition to reference to the time reference. In a refinement of this embodiment, the means for obtaining a location reference utilizes a terrestrial based measurement approach and covariance matrix to establish said location reference.

In addition to the foregoing systems, the present invention discloses several methods of practicing the present invention. In a first method of defining a GPS receiver code-phase search range for an integrated GPS/wireless terminal unit operating in a wireless network having a base station, the steps include calculating a GPS code-phase search range with reference to the base station geographic location plus the wireless coverage area, and with reference to a base station GPS time reference plus the estimated wireless signal propagation delay within the wireless coverage area. Then, transmitting the calculated GPS code-phase search range by the base station for receipt by the terminal unit. In a refinement of this method, the GPS code-phase search range is defined by a center value and a size value.

In another embodiment of the foregoing method, a step of obtaining a time reference for the GPS/wireless terminal unit establishing the time offset relative to the base station GPS time is added. Then, calculating the GPS code-phase search range with reference to the base station geographic location plus the wireless coverage area, and the time reference. In another embodiment, the obtaining step utilizes the round-trip wireless signal propagation time between the base station and the terminal unit to establish the time offset.

In an improvement of the foregoing embodiment, a step of obtaining a location reference for the GPS/wireless terminal unit is added. Then, calculating the GPS code-phase search range with reference to the location reference, and the time reference. In an improvement on this, the obtaining a location reference step utilizes a terrestrial based measurement approach and covariance matrix to establish said location reference.

DESCRIPTION OF THE INVENTION

Illustrative embodiments and exemplary applications will now be described with reference to the accompanying drawings to disclose the advantageous teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
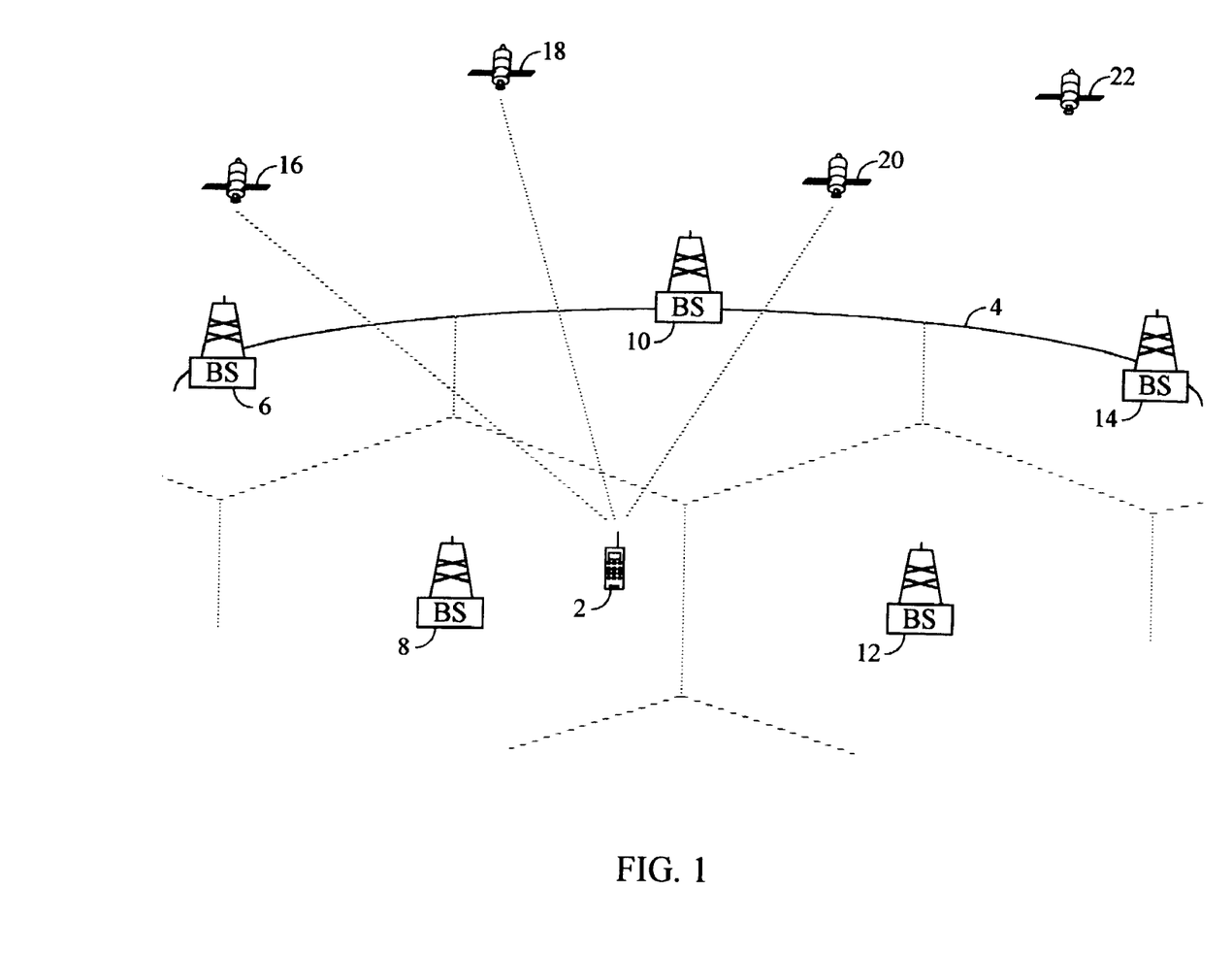
FIG. 1 is a diagram of an exemplary spatial environment on an illustrative embodiment of the present invention.

Reference is directed to FIG. 1, which is a diagram of an illustrative spatial environment in which the present invention would operate. A wireless network is located on the surface of Earth 4 and includes a number of wireless base stations, identified as items 6, 8, 10, 12, and 14 in FIG. 1. Each base station generally defines a region of coverage, often times called a 'cell' of coverage. A mobile terminal unit 2 (or any number of mobile terminal units) operates within the coverage area of the wireless network. The terminal unit 2 generally operates on or near the surface of Earth 4. In the preferred embodiment, the wireless terminal unit comprises a GPS receiver that receives GPS signals from GPS satellites, illustrated as items 16, 18, 20, and 22 in FIG. 1. The wireless terminal unit 2 also includes a CDMA transceiver operating in accordance with EAI-IS-95 in the preferred embodiment, and thereby communicates with the wireless network base stations, illustrated as base station 8 in FIG. 1.

Figure 2:
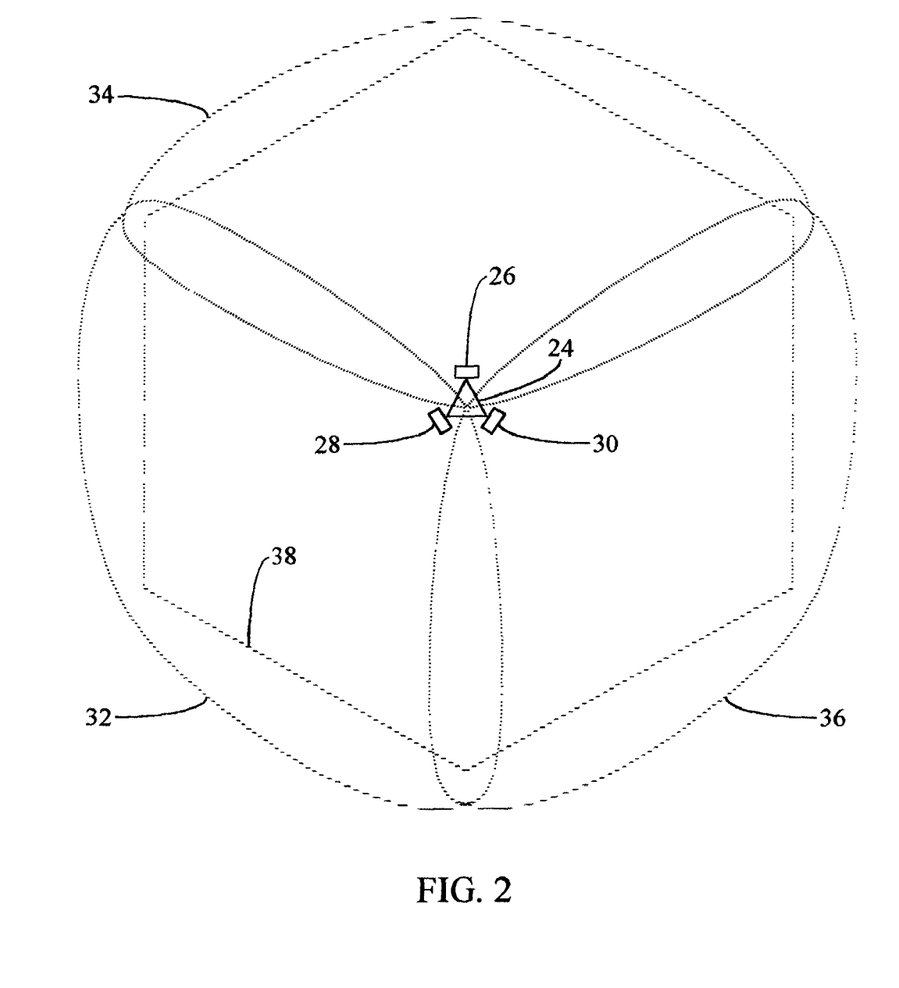
FIG. 2 is a diagram of a wireless base station section arrangement.

Reference is directed to FIG. 2, which illustrates the 'cellular' coverage of a typical wireless base station 24 in the preferred embodiment. The base station 24 may comprise one or more CDMA transceiver systems in the preferred embodiment. In FIG. 2, there are three transceiver systems, coupled to three antennas, illustrated as items 26, 28, and 30 in FIG. 2. The antennas 26, 28, and 30 are generally oriented at 120° with respect to one another and employ directional antennas that radiate and receive signals in a radiation pattern generally shaped like a 120° wedge. Thus, the cellular coverage areas of each antenna 26, 28, and 30 are represented by radiation patterns 34, 32, and 36 respectively. The combination of these patterns generally define the 'cell' of coverage 38 of the wireless system base station 24. With respect to the present invention, it is noted that the wireless network in the preferred embodiment maintains wireless terminal unit call tracking information that resolves which sector and which base station a particular wireless terminal unit is accessing to place or receive a call. Furthermore, the wireless network contains data representative of the geographic area covered by each base station 'cell' and sector. Therefore, the location of a wireless terminal unit operating in a call is known, at least to the extent of the base station coverage area, and perhaps to the extent of the sector coverage area.

Figure 3:
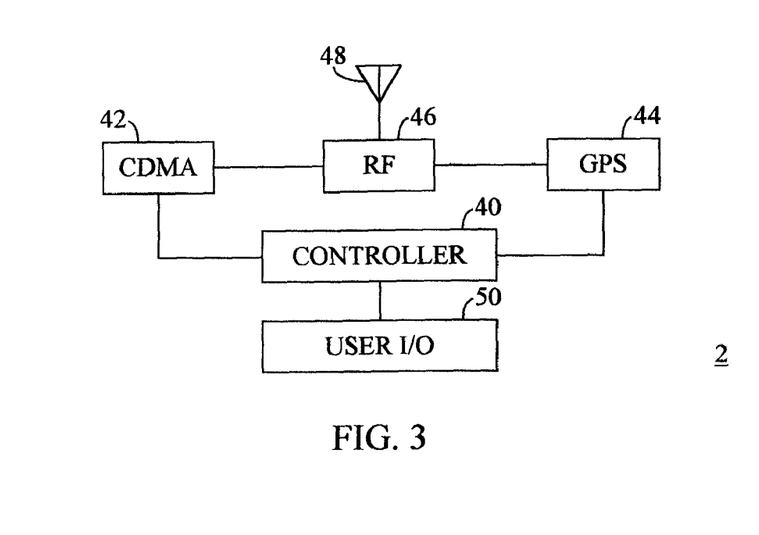
FIG. 3 is a functional block diagram of a wireless terminal unit.

Reference is directed to FIG. 3, which is a functional block diagram of a wireless terminal 2 unit in the preferred embodiment of the present invention. A CDMA transceiver portion 42 and a GPS receiver portion 44 are coupled through a common radio frequency circuit 46 that is coupled to a transmit/receive antenna 48. A controller 40, which is typically microprocessor based and comprises associated circuitry including memory, input/output, and other peripherals, is coupled to the CDMA transceiver 42 and GPS receiver 46 and is operative to control both. In an alternative embodiment, there are two separate controllers that control the CDMA transceiver and GPS receiver respectively. The requirements and functions of the CDMA and GPS portions of the wireless terminal unit in the present invention are well understood by those skilled in the art. In addition, the wireless terminal unit 2 comprises a user input/output portion 50 that may include a microphone, a loudspeaker, displays, key switch inputs, and other devices as are ordinarily employed in wireless transceivers and GPS receivers.

Figure 4:
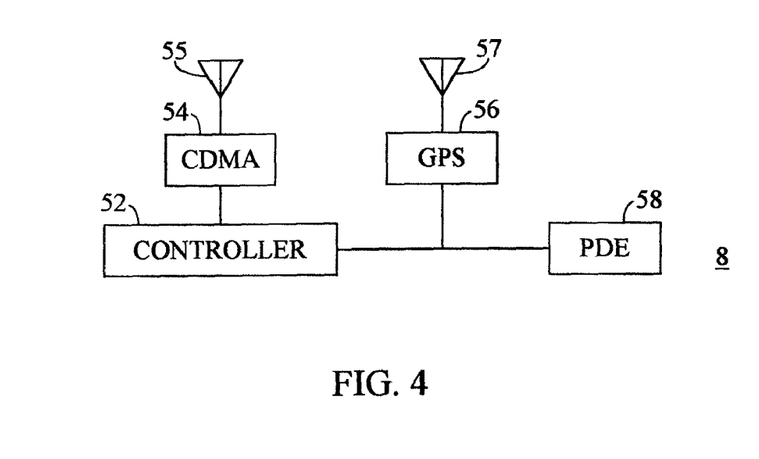
FIG. 4 is a functional block diagram of a base station.

Reference is directed to FIG. 4, which is a functional block diagram of a wireless base station 8 in the preferred embodiment of the present invention. The wireless base station 8 includes those components typically found in a CDMA base station as is understood by those skilled in the art, which generally includes one or more CDMA transceivers 54 and a base station controller 52. The CDMA transceiver 54 is coupled to one or more antennas 55. In the preferred embodiment, a GPS receiver 56 is collocated with the conventional base station components. The GPS receiver 56 is coupled to a GPS antenna 57, and is coupled to the CDMA controller and a separate position determining equipment unit 58 (hereinafter 'PDE'). The GPS receiver tracks all the GPS satellites in its field of view and provides the tracking information, and ephemeris information, to the controller 52 and PDE 58 as needed. The PDE 58 may or may not be collocated with the other base station equipment. The base station 8 is also interfaced with one or more communications networks in a typical installation.

In the preferred embodiment, the approach utilized for wireless terminal unit position determination is for the wireless terminal unit to comprise a GPS receiver, and to employ that receiver to receive the GPS satellite signals, calculate its position and/or velocity information and to communicate that information back to the wireless base station so that this information can be relayed to the entity requesting position information for the wireless terminal units. As was discussed hereinbefore, this will occur automatically when the user of the wireless terminal unit places a '911' call and the position information will be automatically provided to the PSAP.

Position and velocity determination may occur in a number of other implementations of the position determining capabilities of the present invention. By way of example, and not limitation, such applications may include the following:

Location sensitive billing: Wireless can set accurate price differential based on the caller location. This enables wireless carriers to compete with wireline carriers by offering comparable rates when the caller is at home or in the office.

Location-based information services: A user can call a service center to ask for driving directions or get advice on restaurants, hotels, department stores, and gas stations. The service center can also respond to emergency requests by notifying police/fire personnel or ordering a tow truck in the case of a vehicle breakdown.

Network planning: Mobile station location statistics from the wireless network operation can be used to plan expansion or deployment of an entirely new network.

Dynamic network control: The collected location statistics can be used to dynamically adjust network parameters to accommodate network load change due to callers' behavior.

Fraud management: Fraud can have a devastating impact on wireless carriers by reducing profits and undermining the customer's confidence. Location information helps operators ensure prompt detection and tracking leading to swift apprehension of the culprit.

Fleet management and asset tracking: Asset tracking gives the fleet owner the ability to constantly locate company vehicles, to instantly communicate with the driver, or at the push of a button, to update the status of the engine, powertrain, door locks, etc.

Real-time traffic updates: Information received can be sent to traffic management centers to help reduce traffic jams and speed travel.

In any event, the implementation of a GPS receiver has certain limitations in the wireless network environment. There is market pressure to drive the cost of the GPS implementation downward as compared to a stand-alone GPS receiver terminal unit. To address this issue, designers attempt to share CDMA and GPS circuitry components wherever possible. Another approach to reducing cost has been to shift some of the processing away from the wireless terminal unit and back to the wireless base station. This is possible in the wireless network environment because of the relatively high speed communications link between the base station and the terminal unit. For example, it is known that the base station GPS receiver can track the GPS satellites in its field of view, gather the pertinent data and provide this to the wireless terminal units over the CDMA communications links. This function eliminates the need for the wireless terminal unit's GPS receiver to search for the available satellites by PN-code and eliminates the need for the wireless terminal unit to maintain the conventional GPS almanac within it memory.

Another basic limitation of the conventional approach to GPS signal acquisition and measurement is the long time required for the system to acquire and then track the available GPS satellites before a position measurement can be calculated. This is particularly troublesome in the case where a user has an emergency situation that is responded to by turning on the user's wireless terminal unit to place the '911' call. The cold start time may take 5 to 10 minutes. There is a need to reduce the cold-start time for wireless terminal units to address this lag.

Without assistance, a standard GPS receiver needs to search across all satellite PN-code sequences, all PN-code phase hypotheses, and all Doppler frequency offsets in order to receive the necessary satellite signals. This means searching over 24 satellites, 10 kHz in Doppler frequency, and 1023 code hypotheses (which requires 2046 discrete half-chip code shifts and calculations). As noted above, the satellite PN-codes for the geometrically available satellites can be provided to the wireless terminal unit over the relatively fast CDMA communications link, which reduces the number of discrete satellite PN-code sequences from 24 to the set of satellites actually visible, which is typically 8, but may be as few as 4. The base station continuously monitors the GPS constellation and provides this information to the wireless terminal units. Thus, at least the first dimension of the GPS receiver satellite search process is greatly reduced. Another aspect is a reduction of the Doppler shift frequency search range. At least the motion of the satellites, relative to the stationary base stations can be accounted for, and the Doppler search thereby reduced in scope to the relative motion between the base station and the terminal unit, such as the velocity of a speeding automobile. However, the large effort of phase-aligning the received satellite PN-code sequence with the locally generated PN-code sequence remains a time consuming process.

The present invention reduces the time required to phase match the PN-code sequences by providing from the base station to the terminal unit a greatly reduced search window parameter range based on calculations derived from information about the wireless terminal unit's position and time reference. This is possible based on coarse knowledge of the receiver's whereabouts and the receiver's time offset relative to GPS time. In the preferred embodiment, as noted above, a CDMA transmitter/receiver is coupled with a GPS receiver. The CDMA hardware and software allows very efficient communication with the network or any device that is sitting on the Internet (compared with the GPS downlink) or other private network. It also provides, through the means of identifying the base-stations that the wireless terminal unit is in communication with and measuring the time of arrival of CDMA signals, the capability of obtaining a coarse position estimate. Because of the fact that the CDMA wireless terminal unit timing is aligned to the first arriving CDMA signal, and because the CDMA signal is accurately aligned to GPS time, the wireless terminal unit is provided with a very accurate GPS time source (typically within a few tens of microseconds).

The base station generates a mapping between the wireless terminal unit's position and the GPS PN-code phase received. Also, this can be related directly to the pseudo-range measurement as this is the relative phase delay of the PN-codes. Based on the wireless terminal unit position uncertainty area and this mapping, and based on the expected range of clock error in the terminal unit relative to GPS time, the base station then defines a GPS PN-code phase search window center and size. Or, alternatively, it may calculate a start and stop PN-code phase range to define the search window.

In the present invention, there are three basic scenarios considered, and, these are indicative of the other probable scenarios. In the first scenario, the wireless terminal unit's position is resolved only to the area of the wireless network 'cell' site or sector, and the time reference is limited in accuracy to the base station GPS receiver time reference, delayed by the propagation time from the base to the terminal unit.

In the second scenario, the position is resolved to the 'cell' site only, and there is a more accurate time reference, which is determined by correcting base station GPS receiver time for the propagation delay between the base station and the wireless terminal.

In the third scenario, a more accurate time reference is known, as in the second scenario, and, a more accurate position estimate is available, as in the case of a terrestrial based trilateration systems.

Each one of these cases will be analyzed in more detail. All the analysis will be done in units of meters; it is assumed that if necessary it is possible to convert to GPS or CDMA chips. Also, the notation for GPS code-phase will be of taking the direction from early to late (larger code-phase will correspond to larger distance).

First Scenario—Mapping Between User Position and GPS Pseudo-Range

Figure 5:
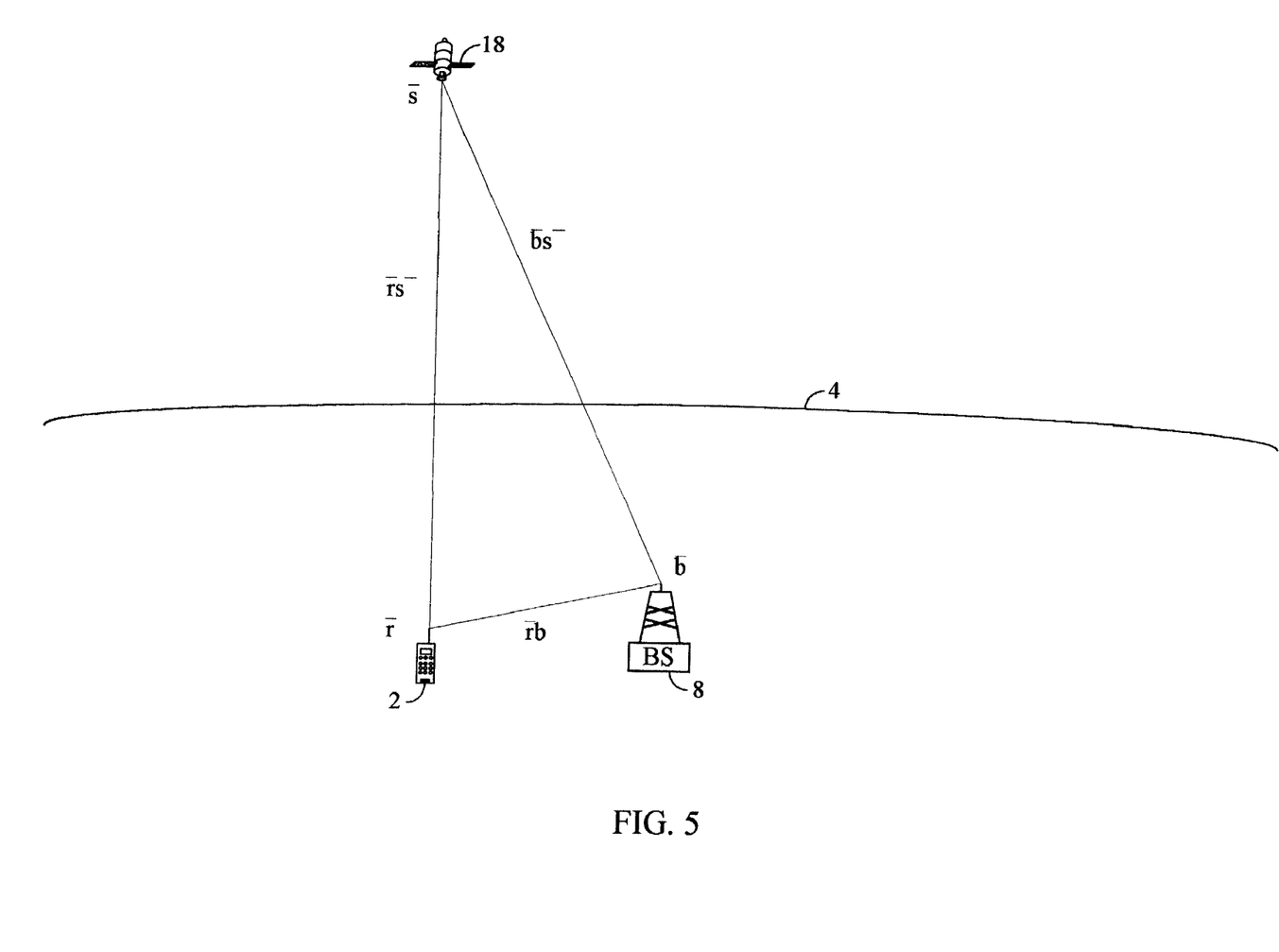
FIG. 5 is a diagram of an illustrative embodiment of the present invention.

Reference is directed to FIG. 5, which is a diagram of the spatial relationship between the base station 8, the wireless terminal unit 2 and one of the GPS satellites 18. The delay of the CDMA signal at the antenna of base station 8 is defined as $c_f$, expressed in meters by dividing the speed of light by the delay expressed as time. This value is obtained through a calibration process in the base station 8 GPS receiver and is stored at the position determination equipment for each base-station in the network. The user, base-station and satellite three-dimensional positions are respectively defined as $\bar{r}$, $\bar{b}$ and $\bar{s}$. Since the base station 8 GPS receiver is typically in tracking mode, and therefore aligned in time with GPS time, it is reasonable to assume that the wireless terminal unit's 2 GPS receiver clock is delayed from actual GPS time by the propagation delay from the base-station 8 to the terminal unit 2. Thus, the relative offset in the satellite pseudo-range due to the receiver clock error is: $\delta_{clock} = -|\bar{r}-\bar{b}| - c_f$. The geometrical offset of the terminal unit 2 relative to the base-station 8 causes the following pseudo-range offset: $\delta_{geometry} = |\bar{r}-\bar{s}| - |\bar{b}-\bar{s}|$. In addition, there is an offset factor $\rho_{BTS}$ inherent in the base station 8 that is: $\rho_{BTS} = |\bar{b}-\bar{s}| + \Delta r - \Delta t \cdot c$, where $\Delta t$ and $\Delta r$ are respectively the satellite clock correction (derived from the satellite ephemeris information) and the earth rotation correction (accounts for the rotation of the earth during signal propagation), both understood by those skilled in the art.

Based on the forgoing value calculations, the best estimate of the pseudo-range measurement at the terminal unit 2 is:

$$\rho_{user} = \rho_{BTS} + \delta_{clock} + \delta_{geometry} = \rho_{BTS} + |\bar{r}-\bar{s}| - |\bar{b}-\bar{s}| - |\bar{r}-\bar{b}| - c_f$$

The term that varies based on the user location is:

$$f(\bar{r}) = |\bar{r}-\bar{s}| - |\bar{r}-\bar{b}|.$$

The search window, then, is defined by the extreme values of this function for terminal unit 2 anywhere within the uncertainty area. Finding the search window center and size is therefore a two-dimensional function, since the terminal unit elevation) maximization/minimization problem is known within a reasonably small range of values based on the terrain in the vicinity of the base station.

First Scenario—Base Station at Center of Uncertainty Area

Figure 6:
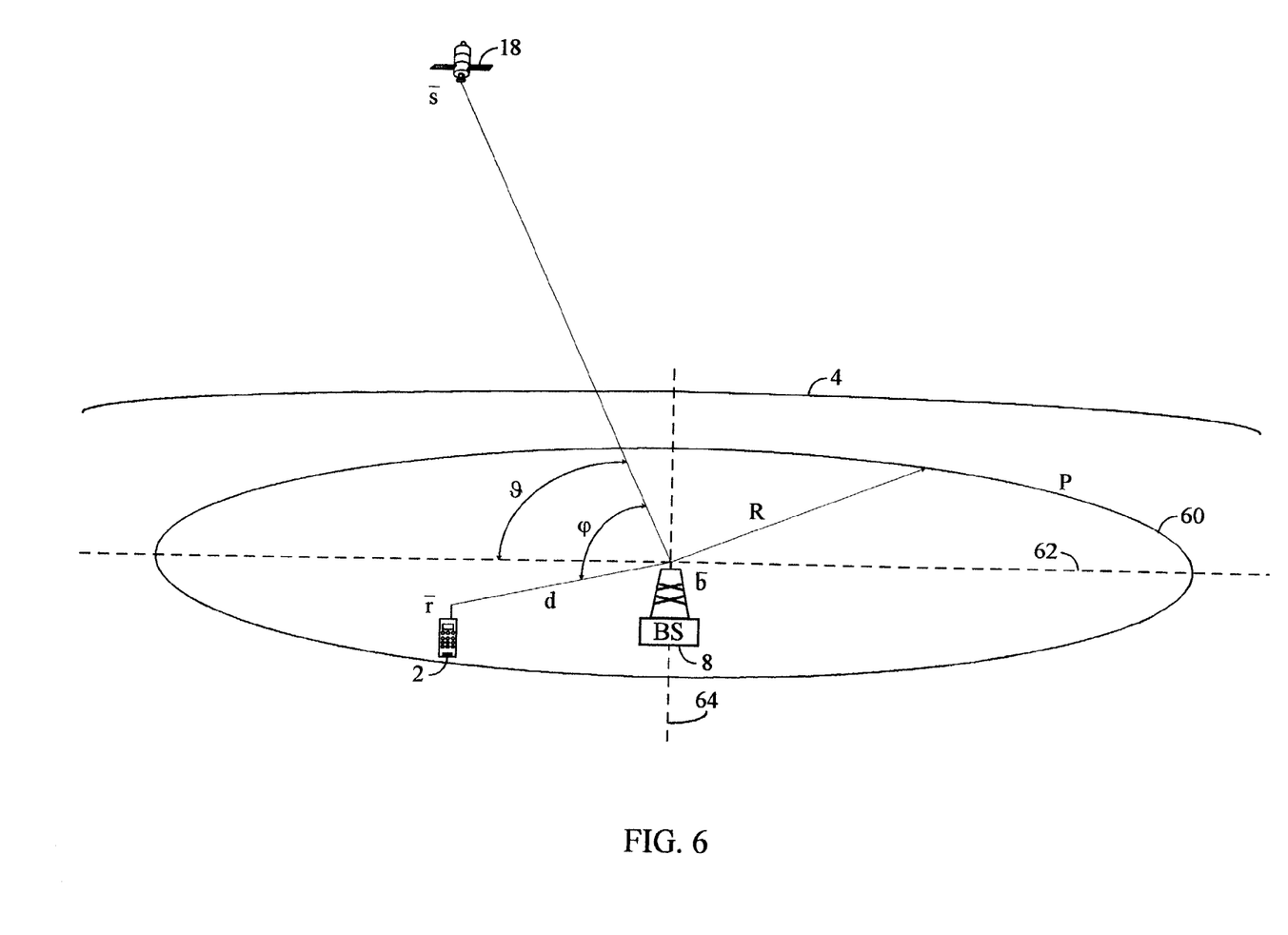
FIG. 6 is a diagram of an illustrative embodiment of the present invention.

Reference is directed to FIG. 6, which is an illustration of the spatial environment of the case where the base station 8 is at the center of the terminal unit 2 location uncertainty area. Let the plane P be a plane parallel to the earth tangential plane passing through the serving base-station location. In this scenario, it is assumed that the terminal unit 2 uncertainty region is a circular disk 60 of radius R on the plane P, centered at the base-station 8 location. The problem can be resolved analytically if it is assumed that the uncertainty area is limited to a radius R of at most 20 km, which is reasonable given to the typical CDMA 'cell' service area. It is further assumed that that the terminal unit 2 is on the same earth tangential plane P as the base-station 8. Note that this will introduce a small amount of error since typically the base-station 8 location is placed at a higher elevation that the terminal unit 2. Because of this assumption, the approximation of the geometrical offset relative to the base-station 8 causes the following pseudo-range difference at the terminal unit: $\delta_{geometry} = |\bar{r}-\bar{s}| - |\bar{b}-\bar{s}| \cong (\bar{r}-\bar{b}) \cdot \bar{1}_s$. The last term of this equation is the unit vector running from the satellite 18 to the base-station 8:

$$\bar{1}_s = \frac{\bar{b} - \bar{s}}{|\bar{b} - \bar{s}|}.$$

The term that varies in the estimate of the pseudo-range measurement as a function of the terminal unit 2 location is therefore: $f(\bar{r}) = (\bar{r}-\bar{b}) \cdot \bar{1}_s - |\bar{b}-\bar{b}|$.

The distance between the terminal unit 2 location and the base station 8 is defined as d, and $\phi$ is defined as the angle between the unit vector $\bar{1}_s$ and the vector going from the base-station 8 antenna to the terminal unit 2 location. Logically, these two parameters have the following ranges: $0 \leq d \leq R$, $-\cos(\upsilon) \leq \cos(\phi) \leq \cos(\upsilon)$, where $\upsilon$ is the satellite 18 elevation relative to plane P 60. Using these parameters, the equation of $f(\bar{r})$ can be rewritten as: $f(d, \phi) = d \cdot (\cos(\phi) - 1)$. And, it is trivial to show that: $-R \cdot (\cos(\upsilon) + 1) \leq f(d, \phi) \leq 0$. Hence, the estimated pseudo-range at any point inside the uncertainty region will be in the interval: $\rho_{BTS} - C_f - R \cdot (\cos(\upsilon) + 1) \leq \rho_{user} \leq \rho_{BTS} - C_f$.

Therefore the search window center and size will be:

$$\rho_{Center} = \rho_{BTS} - c_f - \frac{R \cdot (\cos(\vartheta) + 1)}{2}$$

$$\rho_{Size} = R \cdot (\cos(\vartheta) + 1)$$

First Scenario—General Case

Figure 7:
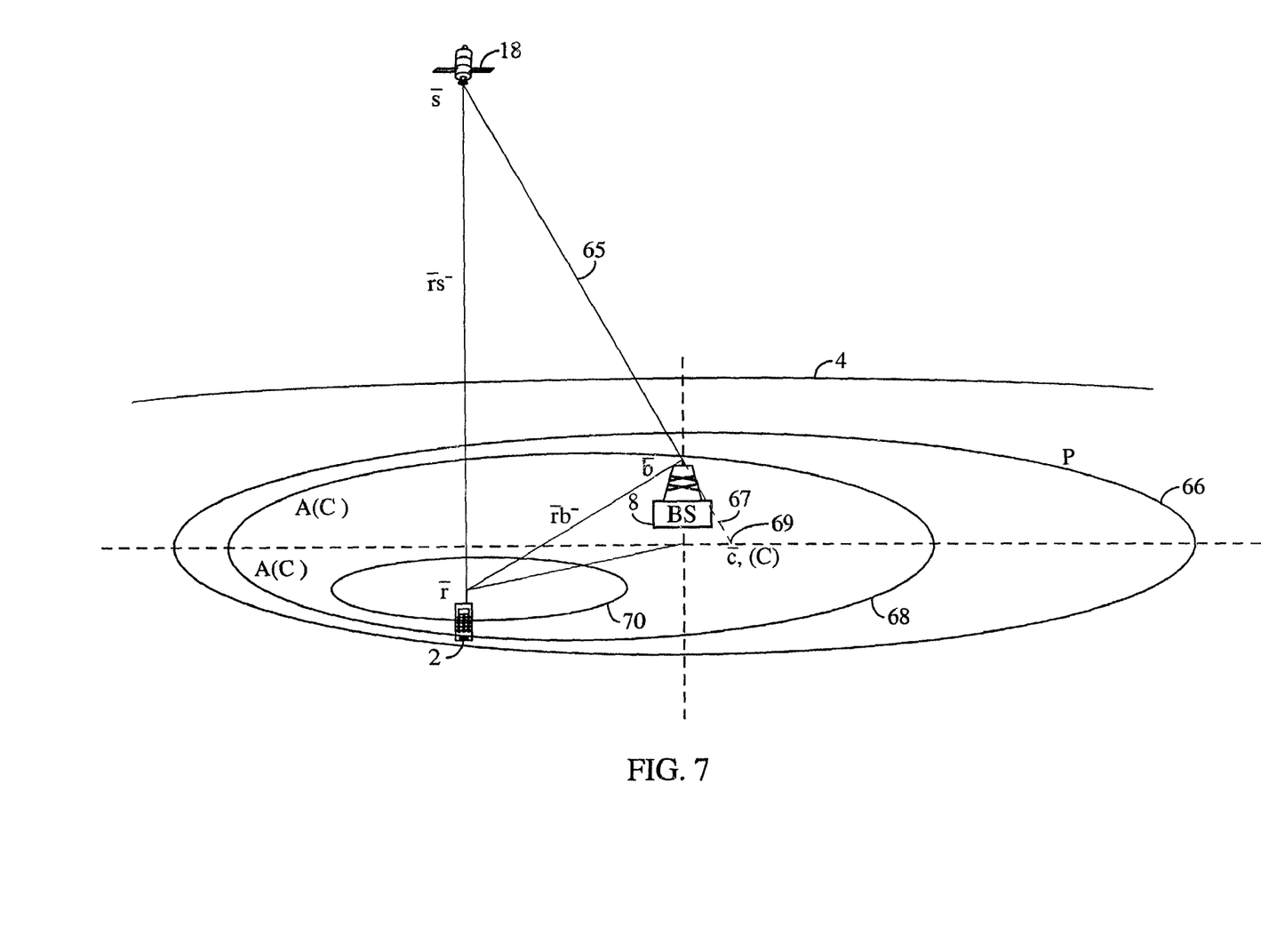
FIG. 7 is a diagram of an illustrative embodiment of the present invention.

Reference is directed to FIG. 7, which is a spatial view of the general case where the uncertainty region is not centered about the base station 8. Let P 66 be a plane parallel to the Earth tangential plane at the base-station 8 antenna location but not necessarily passing through it (typically, it will be below the base station antenna). Also, assume that the satellite 18 is above plane P 66 and that the base station 8 antenna is also above plane P 66. The terminal unit 2 is located within plane P 66 and it is assumed that the terminal unit uncertainty region A, 68 or 70, is a smooth contiguous area on plane P 66. Since EIA IS-801 defines the uncertainty region as an ellipse, in order to make the aforesaid coplanar terminal unit location assumption, A must be restricted to a circle of radius R of at most 50km. This is consistent with the aforementioned 20 km assumption about CDMA 'cell' service area dimensions.

The desired result is, again, to find the minimum and maximum values of the function $f(\bar{r})=|\bar{r}-\bar{s}|-|\bar{r}-\bar{b}|$ for any terminal unit 2 user location within uncertainty region A 68 or 70. Let C (of coordinates $\bar{c}$) 69 be the intersection of the line 67 passing through the base station 8 antenna location and the satellite 18 location with the plane P 66. Two postulates are then considered: Case where C∉A:

In this case, the function will take both its minimum and maximum values on the boundary of the uncertainty area A 70. Since it is known that they are on the boundary, the boundary of A 70 is sampled and the value of the function $f$ at each location is taken. Let $f_{min}$ and $f_{max}$ be the minimum and maximum values that $f$ can take among all the sample locations chosen. The search window center and size are then given by:

$\rho_{Center} = \rho_{BTS} - C_f + f_{min} + f_{max}/$ $\rho_{Size} = f_{max} - f_{min}$ Case where C∈A:

$$\rho_{Center} = \rho_{BTS} - c_f + \frac{f_{min} + f_{max}}{2}$$

$$\rho_{Size} = f_{max} - f_{min}$$

In this case, the function takes its maximum value at the base-station 8 location and its minimum value somewhere on the uncertainty area A 68 periphery. Therefore $f_{max}=f(\bar{c})$. Since it is known that $f_{min}$ is on the boundary of A 68, the boundary is sampled and the value of the function $f$ is computed at each location selected. Again, let $f_{min}$ be the minimum value that $f$ takes among all the sample locations chosen. The search window center and size are then given by:

$$\rho_{Center} = \rho_{BTS} - c_f + \frac{f_{min} + f_{max}}{2}$$

$$\rho_{Size} = f_{max} - f_{min}$$

The number of sample points taken on the surface A will depend on how smooth the uncertainty area is. The smoother the area the fewer the points needed. In the case of an ellipse 20 sample points are enough. Obviously the size selected corresponds to the minimum acceptable guaranty that the terminal unit is going to be within the search window in a virtual noiseless case. When noise is present some margin can be added.

Second Scenario

Figure 8:
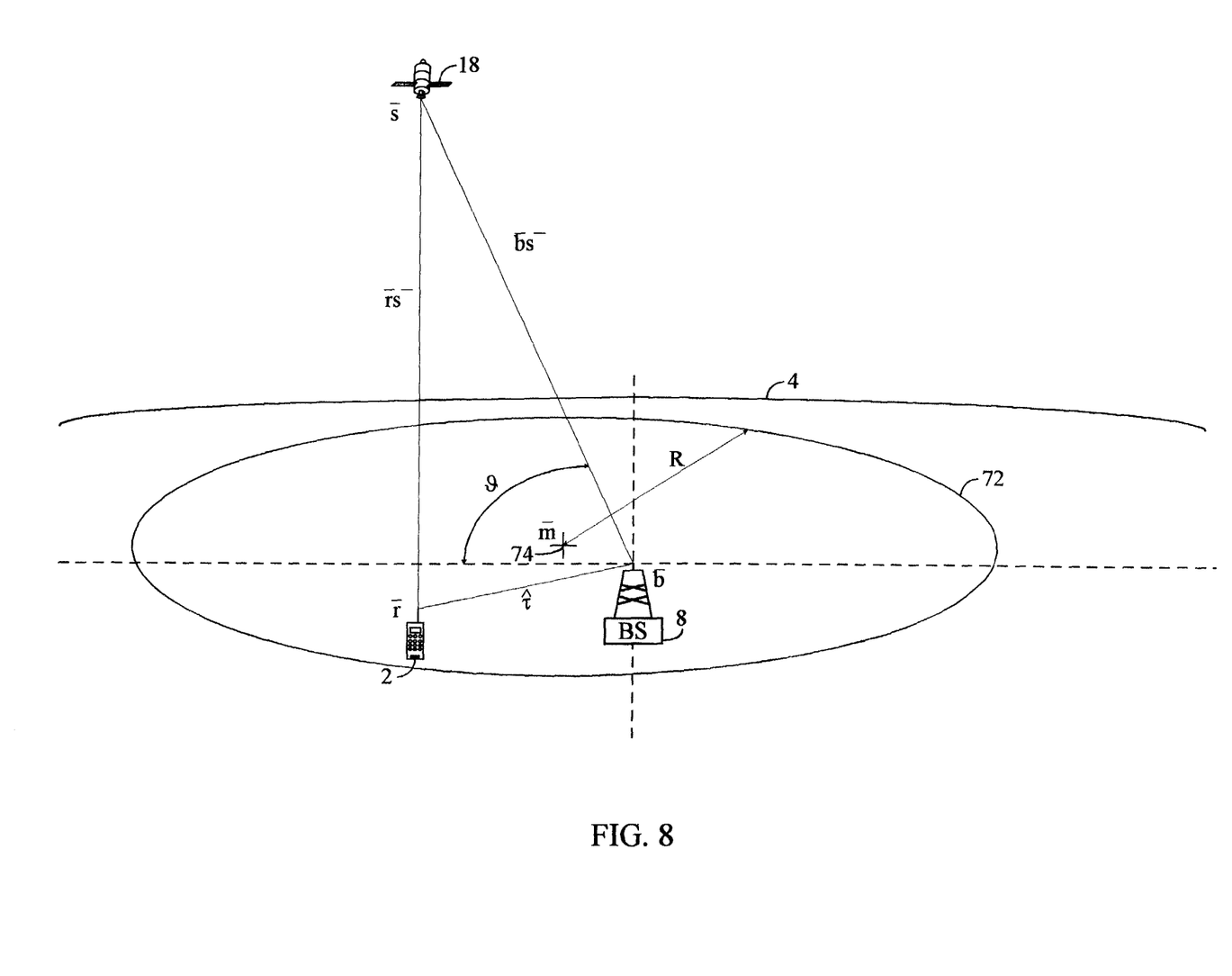
FIG. 8 is a diagram of an illustrative embodiment of the present invention.

Reference is directed to FIG. 8, which is a spatial view of the second scenario. In this scenario, there is a more accurate estimation of the terminal unit 2 clock reference. The variable $\hat{\tau}$ is defined as the estimate of the receiver time bias obtained from the network. Based on this estimate of the terminal unit 2 clock bias, the offset in code phase due to the terminal unit 2 clock error will be: $\delta_{clock}=-\hat{\tau}$. The terminal unit 2, base-station 8 and satellite 18 three-dimensional positions are respectively given by $\bar{r}$, $\bar{b}$ and $\bar{s}$. The geometrical offset relative to base station 8 causes the following code-phase offset: $\delta_{geometry}=|\bar{r}-\bar{s}|-|\bar{b}-\bar{s}|$. Based on these two values, the best estimate of the pseudo-range measurement at the terminal unit 2 location is:

$\rho_{user}=\rho_{BTS}+\delta_{clock}+\delta_{geometry}=\rho_{BTS}+|\bar{r}-\bar{s}|-|\bar{b}-\bar{s}|-\hat{\tau}$ The term that varies based on the terminal unit 2 location is: $f(\bar{r})=|\bar{r}-\bar{s}|$. The search window is then defined by the extreme values of this function for terminal unit 2 positions anywhere within the uncertainty area 72. Finding the search window center and size is therefore a two-dimensional function (since the terminal unit 2 elevation is known within a very small, and statistically insignificant range) maximization/minimization problem.

Figure 9:
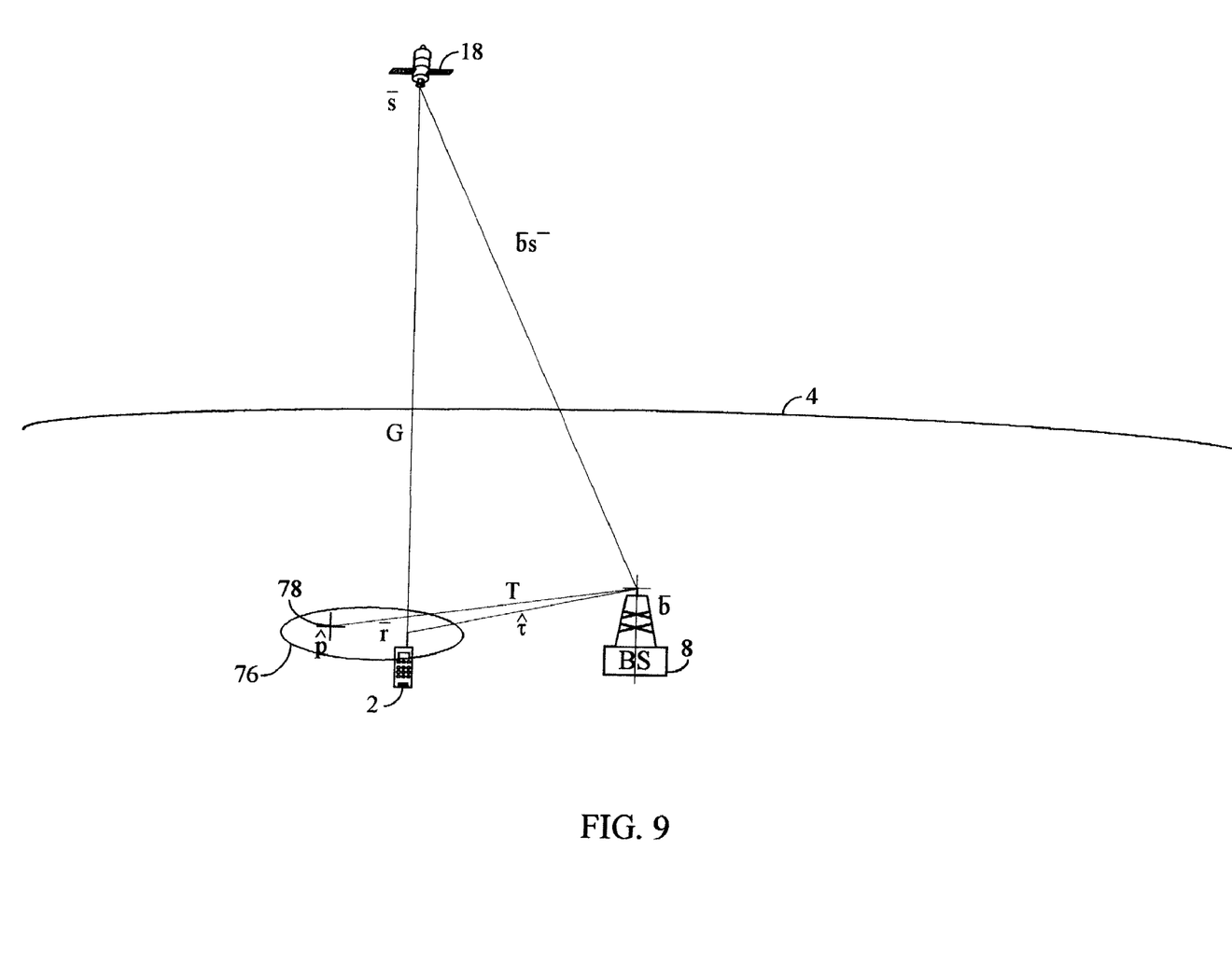
FIG. 9 is a diagram of an illustrative embodiment of the present invention.

In this scenario the function $f(\bar{r})=|\bar{r}-\bar{s}|$ is obviously less complex than in the first scenario. Because the satellite 18 distance is so great, the following simplification is reasonable: $f(\bar{r})=|\bar{r}-\bar{s}|\approx(\bar{r}-\bar{s})\cdot\bar{1}_s$. Where $$\bar{1}_s = \frac{\bar{b}-\bar{s}}{|\bar{b}-\bar{s}|}$$

is the unit vector running from the satellite 18 to the base station 8. Therefore, the pseudo-range interval is a projection of the uncertainty area 72 onto the unit vector going from the satellite 18 to the base station 8. In order to illustrate this, take the simple case where the uncertainty area 72 is circular of radius R, within a plane parallel to the Earth 4 tangential plane at the base station 8 and with center 74 at the point with coordinates $\bar{m}$. The function $f(\bar{r})$ is bounded by the following values: $|\bar{m}-\bar{s}|-R\cdot\cos(\upsilon) \leq f(\bar{r}) \leq |\bar{m}-\bar{s}|+R\cdot\cos(\upsilon)$. The corresponding search window center and size are:

$\rho_{Center}=\rho_{BTS}+|\bar{m}-\bar{s}|-|\bar{b}-\bar{s}|-\hat{\tau}$ $\rho_{Size}=2R\cdot\cos(\upsilon)$ Third Scenario Reference is directed to FIG. 9, which is a spatial view of the third scenario. In this scenario, the base station 8 has a more accurate estimation of both time (as in scenario II) and terminal unit 2 location. Define $\hat{p}=[\hat{x}\ \hat{y}\ \hat{z}]$ 78 and $\hat{\tau}$ respectively the estimate of the user position in the ECEF frame (Earth Centered, Earth Fixed) and the estimate of the receiver time bias both obtained beforehand (most likely from network measurements). In addition to these estimates, it is possible based on information obtained beforehand concerning measurement statistics to obtain an estimated covariance matrix. One of the rows (and the same column) in the matrix corresponds to the time bias estimate. The matrix will be expressed in a specific frame but it is trivial to rotate it so as to bring the x axis to be parallel to the unit vector going from the base station 8 to the satellite 18. After this is done, the variance $\upsilon_G$ of the positioning error along the LOS direction to the satellite G is known. In addition to this, the covariance matrix provides the variance $\upsilon_T$ of the time bias estimate error T and the cross correlation $K_{GT}$ between T and G.

The terminal unit 2, base station 8 and satellite 18 positions are respectively given by $\bar{r}$, $\bar{b}$ and $\bar{s}$. Based on these definitions and assumptions, the offset in code phase due to the receiver clock bias and the position offset are: $\delta_{clock}=-$ $\hat{\tau}$−T and $\delta_{geometry}=|\hat{p}-\bar{s}|-|\bar{b}-\bar{s}|+G$. Based on these two values the best estimate of the pseudo-range measurement at the terminal unit 2 location is:

$$\rho_{user}=\rho_{BTS}+\delta_{clock}+\delta_{geometry}=\rho_{BTS}-\hat{\tau}-T+|\hat{p}-\bar{s}|-|\bar{b}-\bar{s}|+G$$

The term that varies with specific statistics is: $f(G,T)=G-T$.

The function $f(G,T)=G-T$ is handled as a random variable with mean 0 and variance:

$$E[f(G,T)]=E[(G-T)^2]=E[G^2]-2\cdot E[G\cdot T]+E[T^2]=\upsilon_G-2\cdot K_{GT}+\upsilon_T.$$

The corresponding standard deviation is: $\sigma=\sqrt{\upsilon_G-2\cdot K_{GT}+\upsilon_T}$. Based on a trade-off between probability of miss and size of the search window the factor $\alpha$ is selected as the number of standard deviations that should be included in the search window. The final search window center and size are:

$$\rho_{Center}=\rho_{BTS}+|\hat{p}-\bar{s}|-|\bar{b}-\bar{s}|-\hat{\tau}$$

$$\rho_{Size}=2\cdot\alpha\cdot\sqrt{\upsilon_G-2\cdot K_{GT}+\upsilon_T}.$$

Thus, the present invention has been described herein with reference to a particular embodiment for a particular application. Those having ordinary skill in the art and access to the present teachings will recognize additional modifications, applications and embodiments within the scope thereof. For example, while the present invention is described herein with respect to CDMA, those skilled in the art will appreciate that other technologies may be used. In addition, the satellite may be pseudo-lites or other mobile platforms operating in low orbit or high altitude without departing from the scope of the present teachings.

It is therefore intended by the appended claims to cover any and all such applications, modifications and embodiments within the scope of the present invention.

Accordingly,

What is claimed is:

1. A system for transmitting a GPS receiver code-phase search range to a integrated GPS/wireless terminal unit operating in a wireless network, said system comprising:
   a receiver operable to generate a GPS time reference;
   a controller operable to calculate a GPS code-phase search range with reference to a base station geographic location, the wireless coverage area, an angle between a vector extending from the base station to a GPS satellite and a vector extending from the base station to the GPS/wireless terminal unit, said GPS time reference and the estimated wireless signal propagation delay within said coverage area, and
   a transmitter coupled to said controller and operable to transmit said calculated GPS code search range.

2. The invention of claim 1 wherein said GPS code-phase search range is defined by a center value and a size value.

3. A system for transmitting a GPS receiver code-phase search range to a integrated GPS/wireless terminal unit operating in a wireless network, comprising:
   a GPS receiver operable to generate a GPS time reference;
   means for obtaining a time offset for the GPS/wireless terminal unit relative to said GPS time reference;
   a controller operable to calculate a GPS code-phase search range with reference to a base station geographic location, a radius of the wireless coverage area served by the base station, an elevation angle of a GPS satellite, and said time reference; and
   a transmitter coupled to said controller and operable to transmit said calculated GPS code search range.

4. The invention of claim 3 wherein said GPS code-phase search range is defined by a center value and a size value.

5. The invention of claim 3 wherein said means for obtaining a time offset utilizes the round-trip wireless signal propagation time between said base station and the terminal unit to establish said time offset.

6. A system for transmitting a GPS receiver code-phase search range to a integrated GPS/wireless terminal unit operating in a wireless network, comprising:
   a GPS receiver operable to generate a GPS time reference;
   means for obtaining a time offset for the GPS/wireless terminal unit relative to said GPS time reference;
   means for obtaining a location reference for the GPS/wireless terminal unit;
   a controller operable to calculate a GPS code-phase search range with reference to a variance of a positioning error of said location reference, and said time reference; and
   a transmitter coupled to said controller and operable to transmit said calculated GPS code search range.

7. The invention of claim 6 wherein said GPS code-phase search range is defined by a center value and a size value.

8. The invention of claim 6 wherein said means for obtaining a location reference utilizes means for providing terrestrial based trilateration to establish said location reference.

9. A method for defining a GPS receiver code-phase search range for an integrated GPS/wireless terminal unit operating in a wireless network having a base station comprising the steps of:
   calculating a GPS code-phase search range with reference to the base station geographic location plus the wireless coverage area, an angle between a vector extending from the base station to a GPS satellite and a vector extending from the base station to the GPS/wireless terminal unit, and with reference to a base station GPS time reference plus the estimated wireless signal propagation delay within said coverage area and
   transmitting said calculated GPS code-phase search range.

10. The invention of claim 9 wherein said GPS code-phase search range is defined by a center value and a size value.

11. A method for defining a GPS receiver code-phase search range for an integrated GPS/wireless terminal unit operating in a wireless network having a base station, comprising the steps of:
   obtaining a time reference for the GPS/wireless terminal unit establishing the time offset relative to the base station GPS time;
   calculating a GPS code-phase search range with reference to the base station geographic location plus a radius of the wireless coverage area served by the base station, an elevation angle of a GPS satellite, and said time reference; and
   transmitting said calculated GPS code-phase search range.

12. The invention of claim 11 wherein said GPS code-phase search range is defined by a center value and a size value.

13. The invention of claim 11 wherein said obtaining step utilizes the round-trip wireless signal propagation time between said base station and the terminal unit to establish the time offset.

14. A method for defining a GPS receiver code-phase search range for an integrated GPS/wireless terminal unit operating in a wireless network having a base station, comprising the steps of:
- obtaining a time reference for the GPS/wireless terminal unit establishing the time offset relative to the base station GPS time;
- obtaining a location reference for the GPS/wireless terminal unit;
- calculating a GPS code-phase search range with reference to a variance of a positioning error of said location reference, and said time reference; and
- transmitting said calculated GPS code-phase search range by the base station.

15. The invention of claim 14 wherein said GPS code-phase search range is defined by a center value and a size value.

16. The invention of claim 14 wherein said obtaining a location reference step utilizes terrestrial based trilateration techniques to establish said location reference.

17. A system for transmitting a GPS receiver code-phase search range to an integrated GPS/wireless terminal unit operating in a wireless network, said system comprising:
- a receiver operable to generate a GPS time reference;
- a controller operable to calculate the GPS code-phase search range with reference to a base station geographic location, a position estimate of the integrated GPS/wireless terminal unit having an uncertainty area with a center distinct from the base station geographic location, and said GPS time reference; and
- a transmitter coupled to said controller and operable to transmit said calculated GPS code-phase search range.

* * * * *